US012674457B2

(12) United States Patent
Hockley et al.

(10) Patent No.: US 12,674,457 B2
(45) Date of Patent: Jul. 7, 2026

(54) SEALING GASKET WITH ONE OR MORE POSITIONING PROTRUSIONS

(71) Applicant: Edwards Limited, Burgess Hill (GB)

(72) Inventors: Robin Hockley, Burgess Hill (GB); Alan Ernest Kinnaird Holbrook, Burgess Hill (GB); Jan Kolenyak, Lutin (CZ)

(73) Assignee: Edwards Limited, Burgess Hill (GB)

( * ) Notice: Subject to any disclaimer, the term of this patent is extended or adjusted under 35 U.S.C. 154(b) by 0 days.

(21) Appl. No.: 18/873,978

(22) PCT Filed: Aug. 30, 2023

(86) PCT No.: PCT/GB2023/052234
§ 371 (c)(1),
(2) Date: Dec. 11, 2024

(87) PCT Pub. No.: WO2024/062214
PCT Pub. Date: Mar. 28, 2024

(65) Prior Publication Data
US 2025/0369443 A1      Dec. 4, 2025

(30) Foreign Application Priority Data

Sep. 22, 2022    (GB) ..................................... 2213812
Jun. 8, 2023    (GB) ..................................... 2308570

(51) Int. Cl.
*F04C 27/00*          (2006.01)
*F04C 18/12*          (2006.01)
(Continued)

(52) U.S. Cl.
CPC .......... *F04C 27/006* (2013.01); *F04C 18/126* (2013.01); *F04C 25/02* (2013.01);
(Continued)

(58) Field of Classification Search
CPC ... F16J 15/061; F16J 15/062; F16J 15/10–108
See application file for complete search history.

(56) References Cited

U.S. PATENT DOCUMENTS 6,572,351 B2    6/2003  Durand et al.
9,739,278 B2    8/2017  Holbrook et al.
(Continued)

FOREIGN PATENT DOCUMENTS

CN        112815092 A  *  5/2021    ............... F16J 15/16
CN        113123958 A     7/2021
(Continued)

OTHER PUBLICATIONS

Combined Search and Examination Report from counterpart GB Application No. 2308570.7, dated Dec. 5, 2023, 7 Pages.
(Continued)

*Primary Examiner* — Laert Dounis
(74) *Attorney, Agent, or Firm* — Shumaker & Sieffert, P.A.

(57)        ABSTRACT
A sealing gasket (20) for a vacuum pump, the sealing gasket (20) comprising: a first surface (30, 40); a second surface (32, 42) opposite to the first surface (30, 40); opposing side walls (34, 36; 44, 46) disposed between the first surface (30, 40) and the second surface (32, 42); and one or more protrusions (48a, 48b, 48c, 48d) extending from the first surface.

14 Claims, 9 Drawing Sheets

(51) Int. Cl.

| | | |
|---|---|---|
| *F04C 25/02* | (2006.01) | |
| *F16J 15/06* | (2006.01) | |
| *F16J 15/10* | (2006.01) | |

(52) U.S. Cl.
CPC .......... *F04C 27/003* (2013.01); *F04C 27/004* (2013.01); *F16J 15/061* (2013.01); *F16J 15/062* (2013.01); *F16J 15/104* (2013.01); *F16J 15/106* (2013.01)

(56) References Cited

U.S. PATENT DOCUMENTS

| | | | |
|---|---|---|---|
| 9,879,677 B2 | 1/2018 | Kailasam et al. | |
| 11,421,689 B2 | 8/2022 | Schofield et al. | |
| 2002/0155014 A1* | 10/2002 | Durand | F04C 23/001 |
| | | | 418/9 |
| 2004/0017049 A1 | 1/2004 | Fink | |
| 2009/0243229 A1* | 10/2009 | Yoshida | F16J 15/061 |
| | | | 277/596 |
| 2013/0249173 A1* | 9/2013 | Yamamoto | H01M 50/184 |
| | | | 277/639 |
| 2016/0201671 A1 | 7/2016 | Moeser et al. | |
| 2017/0204858 A1 | 7/2017 | Holbrook et al. | |
| 2017/0204859 A1 | 7/2017 | Holbrook et al. | |
| 2020/0284252 A1 | 9/2020 | Stark et al. | |
| 2021/0340979 A1* | 11/2021 | Shinoda | F04C 27/008 |
| 2022/0269257 A1 | 8/2022 | Gordon et al. | |
| 2023/0033204 A1 | 2/2023 | Olivier et al. | |
| 2023/0323888 A1 | 10/2023 | Holbrook | |

FOREIGN PATENT DOCUMENTS

| | | | |
|---|---|---|---|
| CN | 218094518 U | 12/2022 | |
| EP | 2650572 A1 | 10/2013 | |
| EP | 4027276 A1 | 7/2022 | |
| FR | 3112174 A1 | 1/2022 | |
| GB | 1206524 A | 9/1970 | |
| GB | 2559136 A | 8/2018 | |
| GB | 2575987 A | 2/2020 | |
| GB | 2591500 A | 8/2021 | |
| JP | S6058960 U | 4/1985 | |
| JP | H029975 A | 1/1990 | |
| JP | H0211766 A | 1/1990 | |
| JP | 2008298246 A | * | 12/2008 |
| JP | 2011185224 A | 9/2011 | |
| JP | 2020070727 A | 5/2020 | |
| WO | 2011018598 A2 | 2/2011 | |
| WO | 2015175814 A1 | 11/2015 | |
| WO | 2016012758 A1 | 1/2016 | |
| WO | 2020229163 A1 | 11/2020 | |
| WO | 2022117607 A1 | 6/2022 | |
| WO | 2022179819 A1 | 9/2022 | |

OTHER PUBLICATIONS

International Search Report and Written Opinion of International Application No. PCT/GB2023/052232, dated Nov. 8, 2023, 13 Pages.

International Search Report and Written Opinion of International Application No. PCT/GB2023/052234, dated Nov. 6, 2023, 11 Pages.

International Search Report and Written Opinion of International Application No. PCT/GB2023/052235, dated Nov. 28, 2023, 12 Pages.

Search Report from counterpart GB Application No. 2213812.7, dated Mar. 20, 2023, 2 Pages.

Search Report from counterpart GB Application No. 2308577.2, dated Nov. 30, 2023, 2 Pages.

Office Action from U.S. Appl. No. 18/873,984 dated Sep. 19, 2025, 12 pp.

Response to Office Action dated Sep. 19, 2025 from U.S. Appl. No. 18/873,984, filed Dec. 18, 2025, 10 pp.

Office Action from U.S. Appl. No. 18/873,937 dated Jan. 15, 2026, 10 pp.

Notice of Allowance from U.S. Appl. No. 18/873,937 dated May 1, 2026, 12 pp.

Response to Office Action dated Jan. 15, 2026 from U.S. Appl. No. 18/873,937, filed Apr. 15, 2026, 12 pp.

* cited by examiner

140

SEALING GASKET WITH ONE OR MORE POSITIONING PROTRUSIONS

This application is a national stage entry under 35 U.S.C. § 371 of International Application No. PCT/GB2023/052234, filed Aug. 30, 2023, which claims the benefit of GB Application No. 2213812.7, filed Sep. 22, 2022, and GB Application No. 2308570.7, filed Jun. 8, 2023, the entire contents of each of which are incorporated herein by reference.

TECHNICAL FIELD

The field of the disclosure relates to a sealing gasket for a vacuum pump, and a vacuum pump.

SUMMARY

Rotating machines, such as compressors or pumps, need to be carefully designed and manufactured in order for the moving parts to cooperate with each other accurately. Providing effective seals to seal the machine tends to be problematic, particularly when fluid flow is encouraged by a pressure difference between the machine and ambient environment. It is desired to provide an improved seal.

In an aspect, there is provided a sealing gasket for a vacuum pump, the sealing gasket comprising: a first surface; a second surface opposite to the first surface; opposing side walls disposed between the first and second surfaces; and one or more protrusions extending from the first surface.

The sealing gasket may comprise a plurality of protrusions extending from the first surface. The protrusions may be spaced apart from one another at discrete positions across the first surface.

The one or more protrusions may extend substantially perpendicularly from the first surface.

Each of the protrusions may have a cross section, the shape of which is a rounded polygon, e.g. a rounded square or a rounded rectangle.

Each of the protrusions may comprise a proximal end at which the protrusion is connected to the first surface, and a distal end opposite to the proximal end. A length of the protrusion between the proximal end and the distal end may be between 1 mm and 6 mm. The proximal end may be spaced apart from one or both of the opposing side walls in a direction from one side wall to another side wall. The proximal end may be spaced apart from a first side wall in the direction from one side wall to another side wall by a distance of less than or equal to 0.4 mm. The proximal end may be spaced apart from a second side wall in the direction from one side wall to another side wall by a distance of less than or equal to 0.4 mm.

The sealing gasket may be a one-piece gasket. The sealing gasket may be a moulded gasket. The sealing gasket may be deformable. The sealing gasket may be an elastomer.

The sealing gasket may comprise: a first sealing member defining a closed shape; a second sealing member defining a closed shape; a first longitudinal sealing member connected between the first sealing member and the second sealing member; and a second longitudinal sealing member connected between the first sealing member and the second sealing member. The first sealing member and/or the second sealing member may define a respective closed shape selected from the group of closed shapes consisting of an annulus, a circle, an oval, an ellipse, a stadium, a rounded polygon, a rounded square, a rounded rectangle, and a squircle. The first sealing member and/or the second sealing member may each comprise a respective plurality of the protrusions which extended outwardly from an outer surface.

In a further aspect, there is provided a vacuum pump, comprising: shell stators defining at least one pumping chamber; end pieces mountable at either end of the shell stator; and the sealing gasket of any preceding claim.

The shell stators and/or the end pieces may define one or more seal grooves in which the sealing gasket is located. The one or more seal grooves may comprise one or more voids extending from a side wall of the seal grooves. The one or more protrusions may be received in respective voids. The voids may be slots.

For each protrusion and the respective void in which it is received, the length of that void from an open end of the void to a closed end of the void may be greater than the length of the portion of that protrusion that is within the void, thereby to allow for expansion of the protrusion within the void in the direction along the length of the protrusion.

For each protrusion and the respective void in which it is received, the width of that void in a direction that is perpendicular to the direction from an open end of the void to a closed end of the void may be less than or equal to the width of the portion of that protrusion that is within the void, thereby to provide an interference fit of the protrusion in the void.

BRIEF DESCRIPTION OF DRAWINGS

The present disclosure will now be described, by way of example only, with reference to the accompanying drawings.

DETAILED DESCRIPTION

Figure 1:
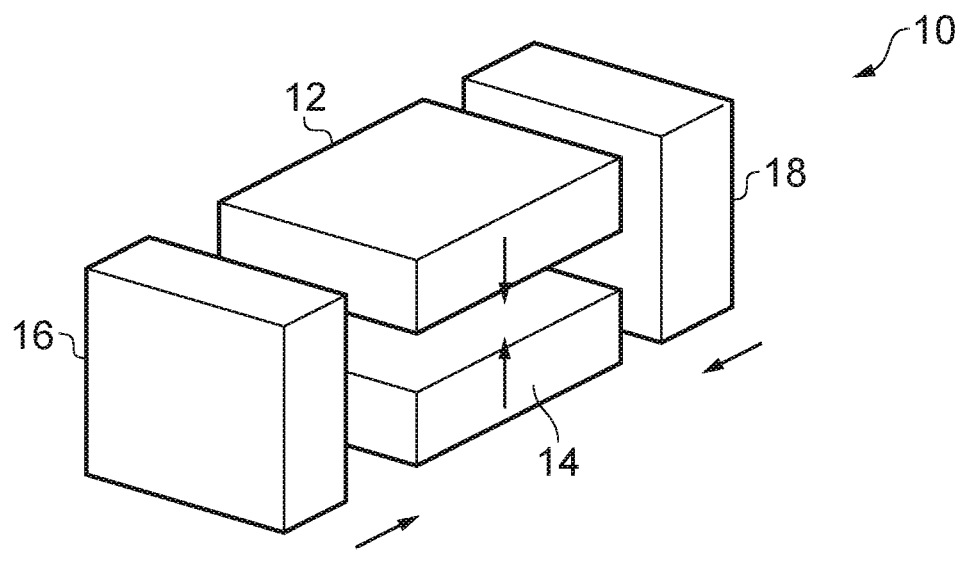
FIG. 1 is a schematic illustration (not to scale) showing a housing of a vacuum pump.

FIG. 1 is a schematic illustration (not to scale) showing a housing 10 of a vacuum pump, according to one example. The housing 10 comprises a pair of shell stators 12, 14 and a pair of end plates 16, 18. The shell stators 12, 14 define recesses which receive components of the vacuum pump. The shell stators 12, 14 are brought together to retain the components in those recesses. The end plates 16, 18 are then brought to retain the shell stators 12, 14. This provides for particularly convenient assembly of the vacuum pump.

In other words, the housing 10 of the vacuum pump may be formed from multiple component parts, including shells 12, 14 and end plates 16, 18 which need to be sealed upon assembly. In the arrangement shown in FIG. 1, the stator is formed by bringing together the two housing parts or shells 12, 14 which are then retained between the pair of end plates 16, 18.

As will be explained in more detail below, in this example, to adequately seal the shell stators 12, 14 together, one or more (e.g. two) longitudinal seals are located along the joining faces of the shell stators 12, 14. Also, to ensure adequate sealing between the shell stators 12, 14 and the respective end plates 16, 18, a pair of annular seals is located between the end plates 16,18 and the shell stators 12, 14.

Figure 2:
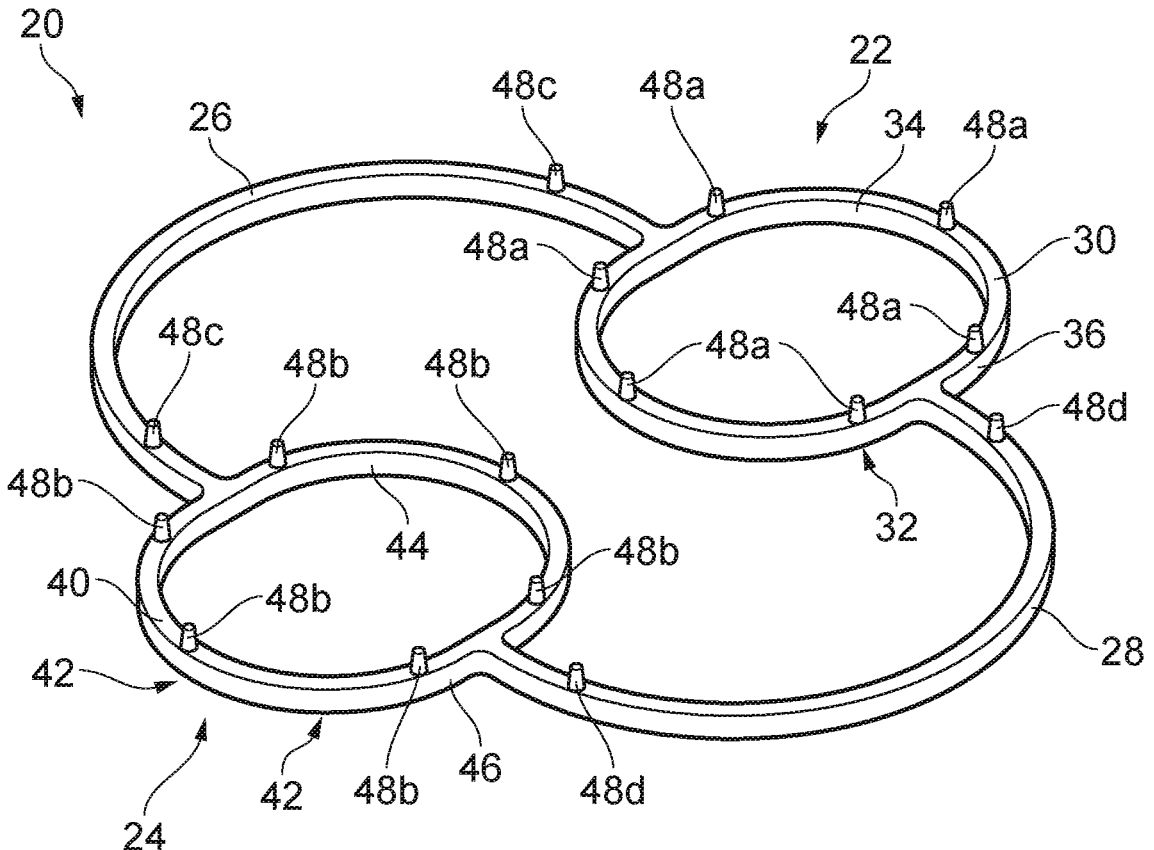
FIG. 2 is a schematic illustration (not to scale) of a sealing gasket.

FIG. 2 is a schematic illustration (not to scale) of a sealing gasket 20 for sealing the housing 10, according to one example.

The sealing gasket 20 comprises a first sealing member 22, a second sealing member 24, a first longitudinal sealing member 26, and a second longitudinal sealing member 28.

In this example, the first and second sealing members 22, 24 are approximately annular sealing members. However, in other examples, the first and second sealing members 22, 24 may have or may define different shapes, preferably closed shapes such as an ellipse, an oval, a stadium, a rounded square, a squircle, a rounded rectangle, or a rounded polygon.

The first sealing member 22 comprises a first annular surface 30, a second annular surface 32 opposite the first annular surface 30, a first radially inner surface 34, and a first radially outer surface 36 opposite to the first radially inner surface 34. The first radially inner surface 34 and the first radially outer surface 36 are disposed between the first annular surface 30 and the second annular surface 32.

The second sealing member 24 comprises a third annular surface 40, a fourth annular surface 42 opposite the third annular surface 40, a second radially inner surface 44, a second radially outer surface 46 opposite to the second radially inner surface 44. The second radially inner surface 44 and the second radially outer surface 46 are disposed between the third annular surface 40 and the fourth annular surface 42.

The first longitudinal sealing member 26 is connected or attached between the first radially outer surface 36 (of the first annular sealing member 22) and the second radially outer surface 46 (of the second annular sealing member 24).

The second longitudinal sealing member 28 is connected or attached between the first radially outer surface 36 (of the first annular sealing member 22) and the second radially outer surface 46 (of the second annular sealing member 24).

The second longitudinal sealing member 28 is arranged opposite to the first longitudinal sealing member 26. That is to say, the second longitudinal sealing member 28 is connected to the first and second annular sealing members 22, 24 and at an opposite side of the first and second annular sealing members 22, 24 to the side at which the first longitudinal sealing member 26 is connected to the first and second annular sealing members 22, 24.

The first annular seal member 22 is a ring-shaped sealing member. The first annular seal member 22 has a square or rectangular cross-section.

The second annular seal member 24 is a ring-shaped sealing member. The second annular seal member 24 has a square or rectangular cross-section.

The first longitudinal sealing member 26 may be an O-ring cord. The first longitudinal sealing member 26 has a square or rectangular cross-section.

The second longitudinal sealing member 28 may be an O-ring cord. The second longitudinal sealing member 28 has a square or rectangular cross-section.

In this example, the sealing gasket 20 is a continuous one-piece sealing gasket.

In this example, the sealing gasket 20 comprises a plurality of protrusions 48a, 48b, 48c, 48d. More specifically, the sealing gasket 20 comprises a first plurality of protrusions 48a that extend normally from the first annular surface 30. Also, the sealing gasket 20 comprises a second plurality of protrusions 48b that extend normally from the third annular surface 40. Also, the sealing gasket 20 comprises a third plurality of protrusions 48c that extend normally from an upper surface (in the orientation of FIG. 1) of the first longitudinal sealing member 26. Also, the sealing gasket 20 comprises a fourth plurality of protrusions 48d that extend normally from an upper surface (in the orientation of FIG. 1) of the second longitudinal sealing member 28.

Preferably, the plurality of protrusions 48a, 48b, 48c, 48d are substantially identical in shape and size.

The sealing gasket 20 may be made of a deformable or flexible material, such as an elastomer material (e.g. a fluoroelastomers (FKM/FPM) or a perfluoroelastomer (FFKM)) or silicon, such that the sealing gasket 20 is deformable or flexible. Thus, the sealing gasket 20 may be deformed into a desired shape or configuration suitable for use as a seal for the housing 10.

Figure 3:
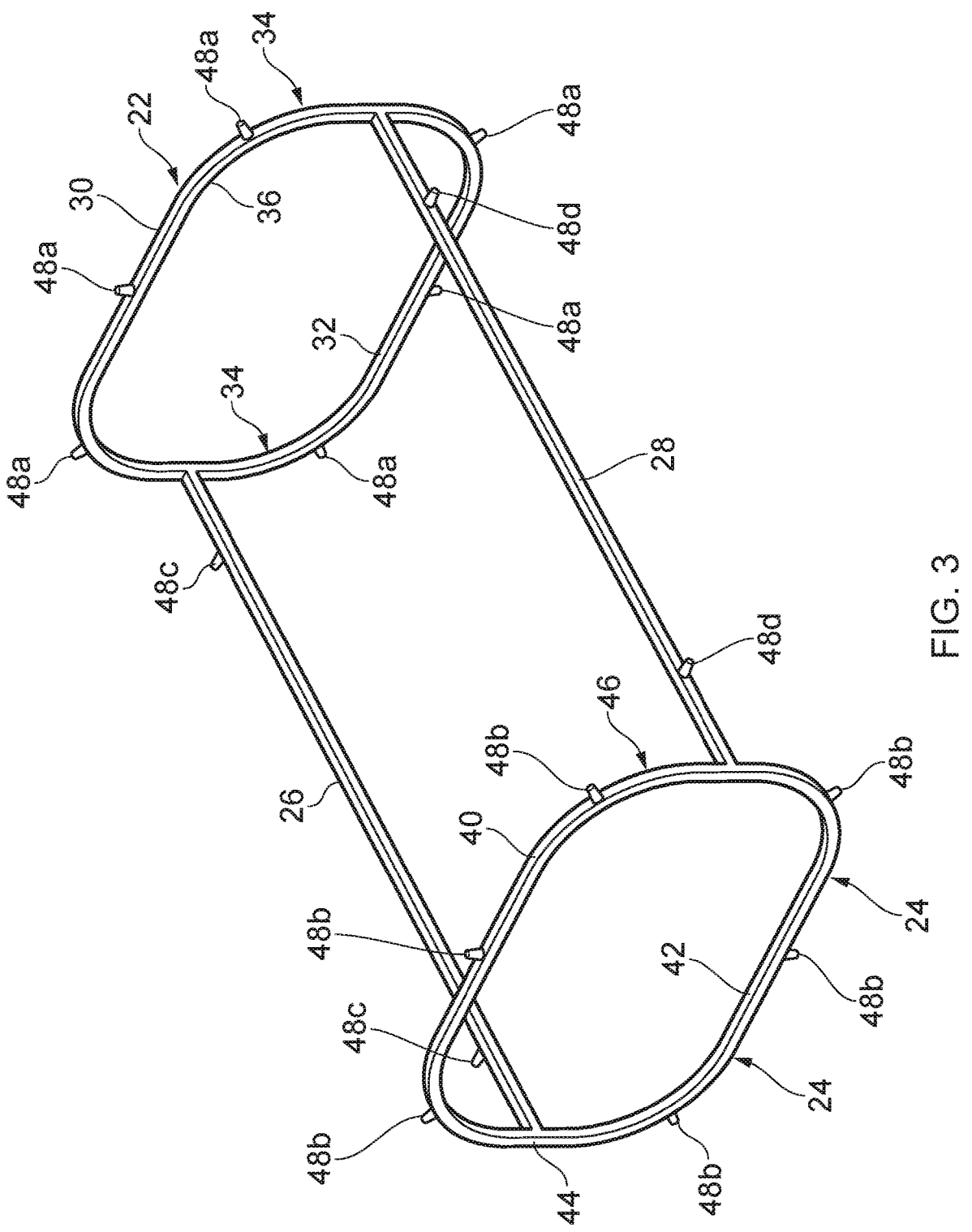
FIG. 3 is a further schematic illustration (not to scale) of the sealing gasket.

FIG. 3 is a schematic illustration (not to scale) showing the sealing gasket 20 that has been deformed into a configuration that may be suitable for sealing the housing 10.

In this configuration, the first and second sealing members 22, 24 are rounded square, i.e. define squares with curved or rounded corners. The configuration has major faces (which are the first radially inner surface 34 and the first radially outer surface 36 of the first sealing member 22, and the second radially inner surface 44 and the second radially outer surface 46 of the second annular sealing member 24) which, in use, abut against major faces of the end plates 16, 18 and the adjacent faces of the shell stators 12, 14. In this example, the first and second sealing members 22, 24 have substantially planar, axially outer faces, provided by the first radially inner surface 34 and the second radially inner surface 44 respectively. The first and second sealing members 22, 24 have substantially planar, axially inner faces, provided by the first radially outer surface 36 and the second radially outer surface 46 respectively. The longitudinal sealing members 26, 28 are connected between the facing axially inner faces of the annular sealing members 22, 24 (i.e., between the first radially outer surface 36 and the second radially outer surface 46). The annular sealing members 22, 24 have substantially constant thicknesses.

In this configuration, the first annular surface 30 of the first sealing member 22 has been moved or rotated so that it defines a radially outer wall of the first sealing member 22. Thus, each protrusion 48a in the first plurality of protrusions 48a extends radially outwards from the first annular surface 30.

Similarly, in this configuration, the third surface 40 of the second sealing member 24 has been moved or rotated so that it defines a radially outer wall of the second sealing member 24. Thus, each protrusion 48$b$ in the second plurality of protrusions 48$b$ extends radially outwards from the third surface 30.

In this configuration, the first longitudinal sealing member 26 has been moved or rotated so that each protrusion 48$c$ in the third plurality of protrusions 48$c$ extends outwards from the sealing gasket 20 in a direction that is substantially perpendicular to a direction along the length of the sealing gasket 20.

Similarly, in this configuration, the second longitudinal sealing member 28 has been moved or rotated so that each protrusion 48$d$ in the fourth plurality of protrusions 48$d$ extends outwards from the sealing gasket 20 in a direction that is substantially perpendicular to a direction along the length of the sealing gasket 20, and in an opposite direction to that in which the protrusions 48$c$ extend.

Figure 4:
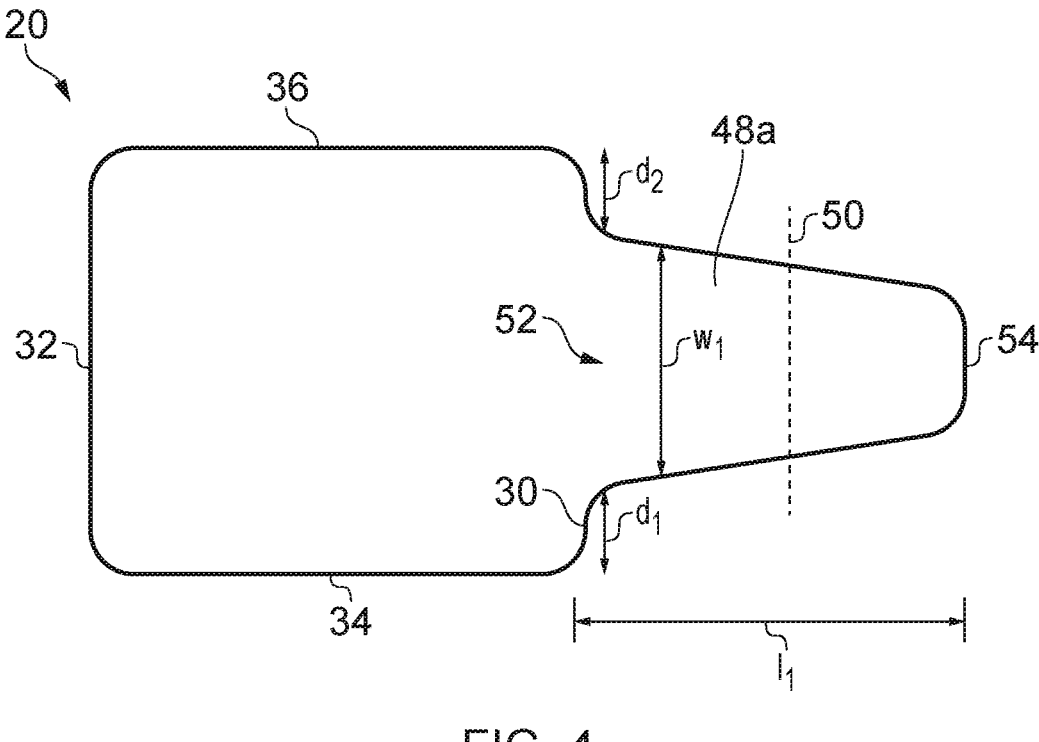
FIG. 4 is a schematic illustration (not to scale) of a cross section of the sealing gasket.

FIG. 4 is a schematic illustration (not to scale) showing a cross section through the seal gasket 20 at the location of a protrusion 48.

In particular, FIG. 4 shows a cross section through the first sealing member 22 along the length of a first protrusion 48$a$. It will be appreciated by those skilled in the art that the protrusions 48$b$-$d$ in the second, third and fourth pluralities of protrusions 48$b$-$d$ may be similarly formed.

In this example, the protrusion 48$a$ extends substantially perpendicularly from the first annular surface 30 away from the first seal member 20.

Preferably, the protrusion 48$a$ has a cross-section that has the shape of a rounded polygon. In this example, the shape of the cross-section of the protrusion 48$a$ taken through the plane perpendicular to the page of FIG. 4 and indicated by a dotted line 50 is that of a rounded square or a rounded rectangle.

The protrusion 4$a$ comprises a proximal end 52 at which the protrusion 48$a$ is connected to the first annular surface 30, and a distal end 54 opposite to the proximate end 52.

The length $l_1$ of the protrusion 48$a$ between the proximal end 52 and the distal end 54 may be application dependent. For example, the length $l_1$ may be between about 1 mm and 6 mm, or between about 2 mm and 5 mm, or between about 3 mm and 5 mm, for example a preferred value of $l_1$ may be about 4 mm.

In this example, the proximal end 52 is spaced apart from the first radially inner surface 34 (in a direction along the first annular surface 30) by a first distance di. The first distance di may be application dependent. For example, the first distance di may be less than or equal to about 0.4 mm, or less than or equal to about 0.3 mm, or less than or equal to about 0.2 mm, or less than or equal to about 0.1 mm, for example the preferred value of di may be about 0.1 mm.

In this example, the proximal end 52 is spaced apart from the first radially outer surface 36 (in a direction along the first annular surface 30) by a second distance $d_2$. Preferably, the second distance $d_2$ is approximately equal to the first distance $d_1$. The second distance $d_2$ may be application dependent. For example, the second distance $d_2$ may be less than or equal to about 0.4 mm, or less than or equal to about 0.3 mm, or less than or equal to about 0.2 mm, or less than or equal to about 0.1 mm, for example the preferred value of $d_2$ may be about 0.1 mm.

In this example, the protrusion 48$a$ tapers along its length. In other words, the width $w_1$ of the protrusion 48$a$ decreases (e.g. linearly) from its proximal end 52 to its distal end 54.

Figure 5:
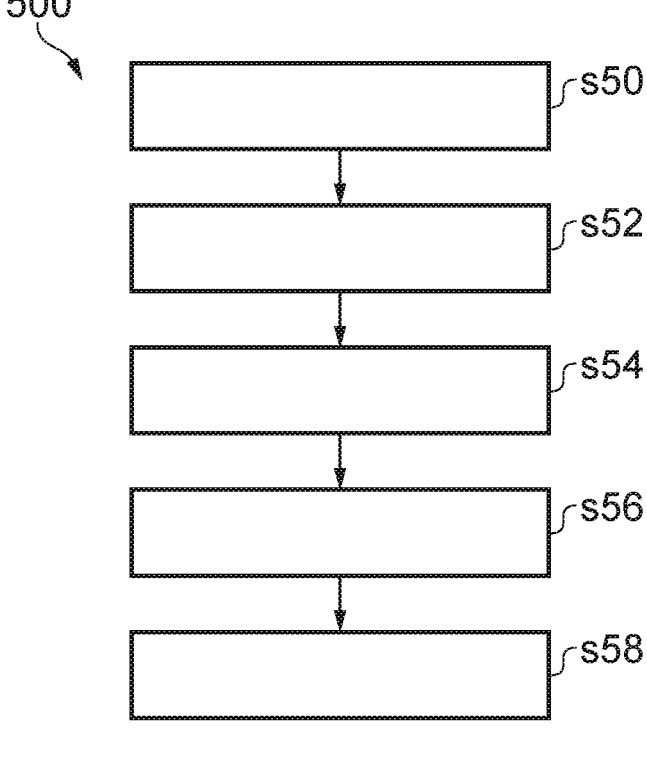
FIG. 5 is a process flow chart showing certain steps of a method of incorporating the sealing gasket into the housing.

FIG. 5 is a process flow chart showing certain steps (s50-s58) of a method 500 of fitting, installing, or incorporating the sealing gasket 20 into the housing 10.

Figure 6:
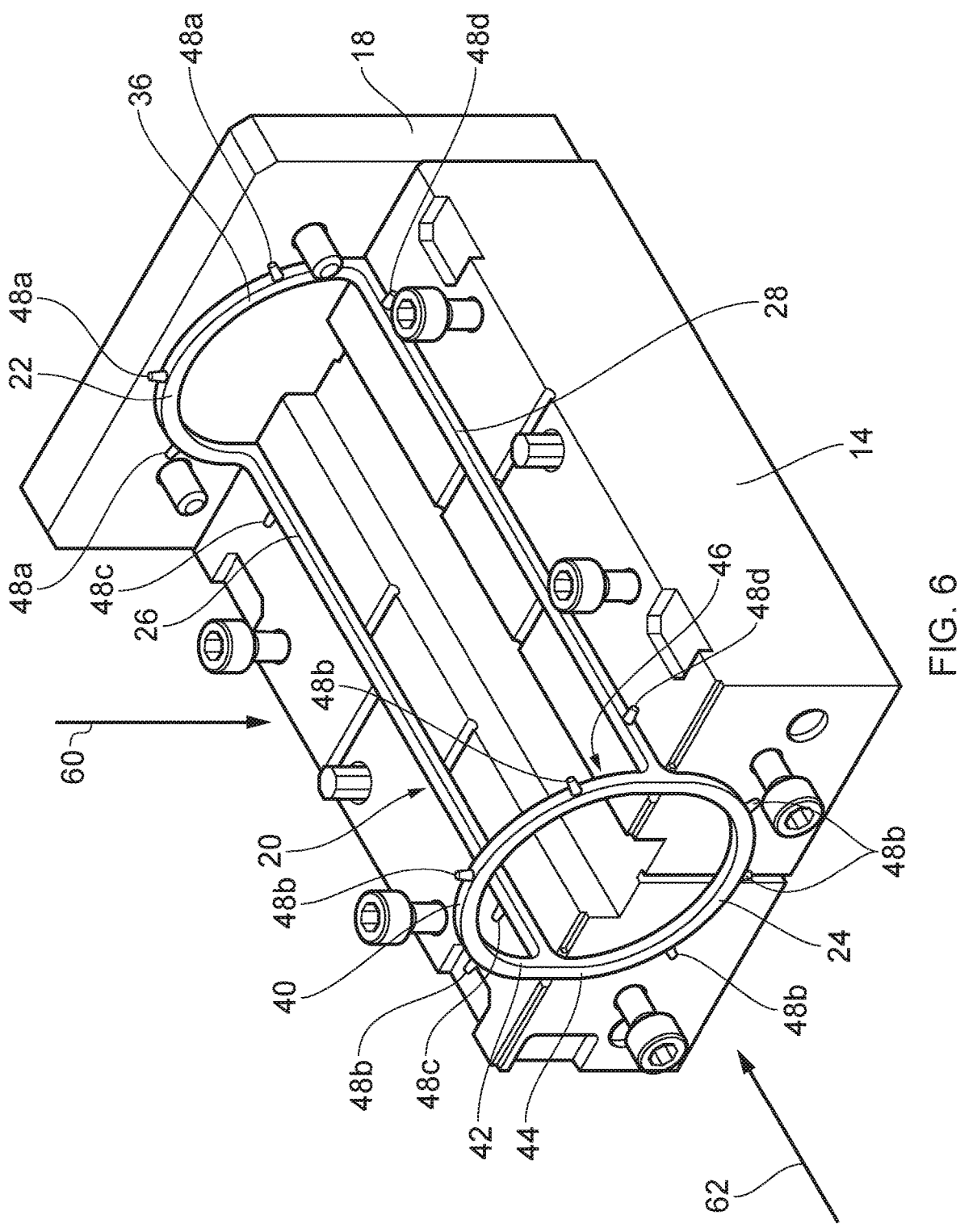
FIG. 6 is a schematic illustration (not to scale) showing sealing gasket incorporated into the housing.

FIG. 6 is a schematic illustration (not to scale) illustrating the incorporation of the sealing gasket 20 into the housing 10, useful in understanding the process of FIG. 5.

At step s50, the shell stator 14 is provided, into which components (not shown) of the vacuum pump may be assembled.

At step s52, the sealing gasket 20 is positioned relative to the shell stator 14 such that the first and second longitudinal sealing members 26, 28 are located along the joining face of shell stator 14, in seal grooves extending along the joining face of shell stator 14. This may be as depicted in FIG. 6.

At step s54, the shell stator 12 is brought into close contact with the longitudinal sealing members 26, 28.

Referring to FIG. 6, the shell stator 12 may be moved onto the longitudinal sealing members 26, 28 towards the joining face of shell stator 14, as indicated in FIG. 6 by an arrow and the reference numeral 60.

At step s56, the shell stators 12, 14 are clamped together, which compresses the longitudinal sealing members 26, 28.

Thus, after step s56, the annular sealing members 22, 24 tend to extend or protrude axially from the axial ends of the assembled together shell stators 12, 14.

At step s58, the end plates 16, 18 are brought together to compress the annular seals 22, 24 in the axial (i.e. longitudinal) direction.

The annular sealing members 22, 24 are located in annular seal grooves located in the shell stators 12, 14 and/or the end plates 16, 18.

Referring to FIG. 6, the end plate 18 is shown having been moved onto the first annular sealing member 22 at a first end of the assembled together shell stators 12, 14. The end plate 16 may be moved onto the second annular sealing member 24 at a second end (opposite to the first end) of the assembled together shell stators 12, 14, as indicated in FIG. 6 by an arrow and the reference numeral 62.

Thus, a method of fitting, installing, or incorporating the sealing gasket 20 into the housing 10 is provided.

In this example, the sealing gasket 20 is located in seal grooves formed in one or both of the shell stators 12, 14 and/or the end plates 16, 18. The seal grooves comprise a plurality of voids or slots in which respective ones of the protrusions 48$a$-$d$ are received.

Figure 7:
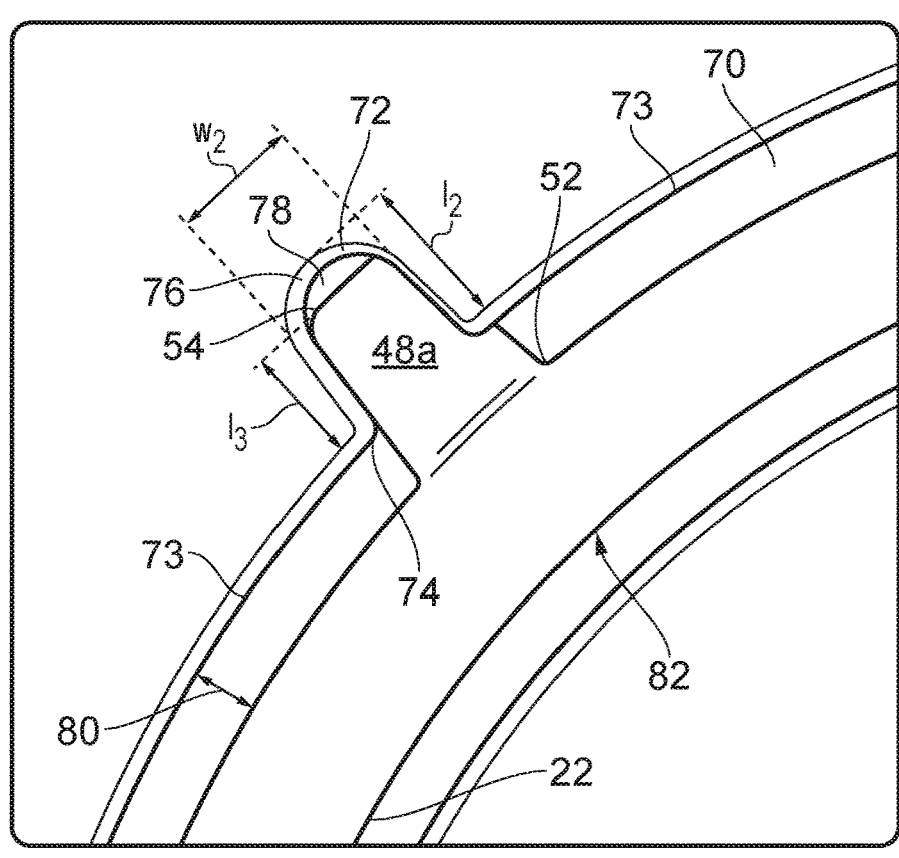
FIG. 7 is a schematic illustration (not to scale) showing a portion of the sealing gasket in the housing.

FIG. 7 is a schematic illustration (not to scale) showing an example portion of a seal groove 70 in which the first sealing member 22 of the sealing gasket 20 is fitted. Other portions of the sealing gasket 20 may be located in other seal grooves in similar or identical fashion.

The seal groove 70 is a closed shape seal groove and may have the shape of, for example, an annulus, a loop, a ring, an ellipse, an oval, a rounded square or rounded rectangle (i.e. a square or rectangle with rounded corners), a squircle, or a rounded polygons.

The seal groove 70 may be formed in an end surface of a shell stator 12, 14 or an end plate 16, 18.

The seal groove 70 comprises a void or slot 72 extending outwardly from a side wall of the seal groove, specifically an outer wall 73 of the seal groove 70. At least a portion of the protrusion 48$a$ of the first sealing member 22 is located in the slot 72.

In this example, the length 12 of the slot 72 from an opening or open end 74 of the slot 72 to a closed end 76 of the slot 72 is greater than the length 13 of the portion of the protrusion 48$a$ that is located in the slot 72. Thus, there is a gap 78 between the distal end 54 of the protrusion 48$a$ and the closed end 76 of the slot 72. This advantageously tends to allow for expansion of the protrusion 48$a$ within the slot 72 in the direction along the length of the protrusion, for example due to the heating and/or compression of the sealing gasket 20.

In this example, the width $w_2$ of the slot 72 (the width $w_2$ being in a direction that is perpendicular to the length $l_2$ of the slot 72) is less than or equal to the width of the portion of the protrusion 48a that is within the slot 72. This advantageously tends to provide an interference fit of the protrusion 48a in the slot 72. Thus, during assembly (e.g. during step s52 of the method 500 of FIG. 5), the sealing gasket 20 tends to be held in place by the protrusions 48a-d being held or gripped in the slots 72. Twisting or movement of the sealing gasket 20 out of the seal grooves tends to be reduced or eliminated. This tends to reduce the likelihood of the seal gasket 20 being out of position in the assembled system, and thus the likelihood of gas leakage is reduced.

Preferably, the first sealing member 22 is thinner than the seal groove 70. Also, preferably, proximate the proximal end of the protrusion 48a, the width $w_1$ of the protrusion 48a is sufficiently larger than the opening 74 of the slot 72 so that that portion of the protrusion 48a cannot be fitted into the slot 72. This advantageously tends to provide that, remote from the protrusion 48a, the first sealing member 22 is within the seal groove 70 but is spaced apart from the outer wall 73 of the seal groove 70, i.e. that there is a gap 80a between the first sealing member 22 and the outer wall 73. Furthermore, in this example, when the first sealing member 22 is fitted into the seal groove 70 and the protrusion 48a is received in the slot 72 (as shown in FIG. 7), the first sealing member 22 is spaced apart from the inner wall 82 of the seal groove 70, i.e. there is a gap 80b between the first sealing member 22 and the inner wall 82. (The inner wall of 82 is opposite to the outer wall 73.) This advantageously tends to allow for expansion of the first sealing member 22 within the seal groove 70, for example due to the heating and/or compression of the sealing gasket 20. Also, this advantageously tends to facilitate installation of the sealing gasket into the housing 10.

Figure 8:
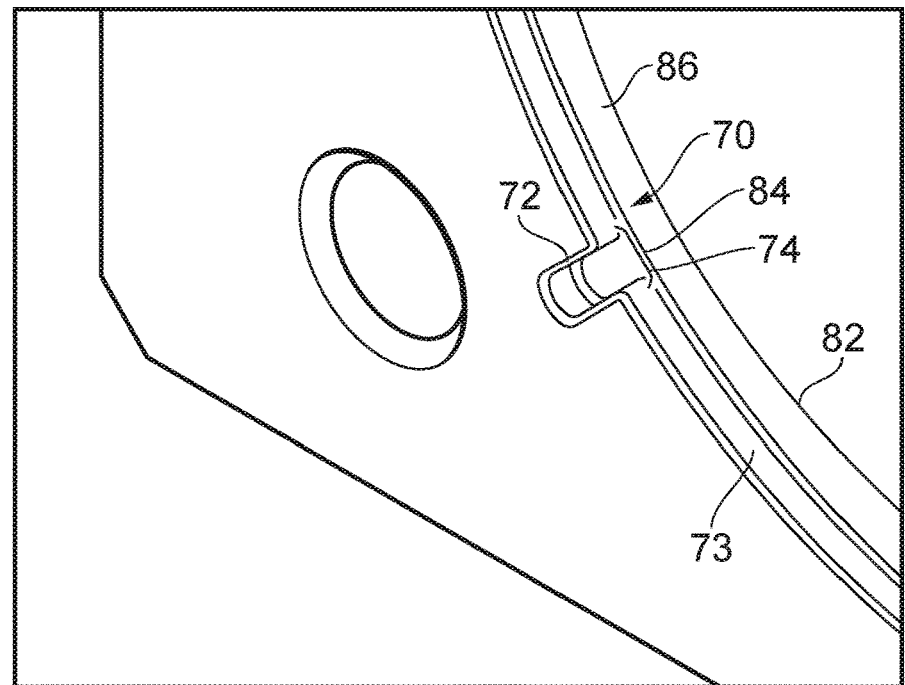
FIG. 8 is a schematic illustration (not to scale) showing a portion of the housing.

FIG. 8 is a schematic illustration (not to scale) shows the seal groove 70 and slot 72, without the sealing gasket 20 disposed therein.

In this example, there is a step 84 between a bottom surface 86 of the seal groove 70 and the opening 74 of the slot 72. Preferably, the size of the step 84 along the outer wall 73 from the bottom surface 86 of the seal groove 70 to the opening 74 is substantially the same as the first distance di and/or the second distance $d_2$.

The sealing gasket tends to be easy to install into a housing or a vacuum pump.

Advantageously, the sealing gasket described herein tends to be relatively easy to produce or manufacture compared to conventional sealing assemblies. For example, the sealing gasket tends to be relatively easy to produce via moulding. For example, the sealing gasket can be moulded, in a mould, as a single-piece, as a substantially planar or flat item (as shown in FIG. 2 and described in more detail earlier above), and then deformed or manipulated into a desired shape or configuration (e.g., such as that shown in FIG. 3 and described in more detail earlier above). Moulding may be performed using a mould tool comprising a first part comprising a recess that is the desired shape of the sealing gasket; a substantially planar second part can be placed over the recess in the first part thereby to define a mould cavity in which the sealing gasket can be formed. Advantageously, the sealing gasket formed in this way tends not to have a parting line (where the two different side of the mould come together). Thus, the potential for separation of the sealing gasket tends to be greatly reduced. Moreover, any mould flash present on the moulded sealing gasket tends to be restricted to non-critical areas of the sealing gasket, such as extending outwards from the upper surface of the sealing gasket when in the orientation of FIG. 2). This tends to improve robustness and stability of the sealing gasket.

The sealing gasket can be designed slightly shorter than the longitudinal grooves in the shell stators (i.e. the gasket grooves) so that it has a low tension during assembly. This tends to make the sealing gasket self-positioning regardless of the annular groove depths.

Advantageously, it tends to be possible to mould the sealing gasket on its side in one plane (i.e. in the configuration of FIG. 2). This tends to achieve a continuous sealing surface from the side walls of the mould tool, without any split-lines, which ensures a high integrity sealing surface. This one-piece seal shape tends to be reconfigurable to fit the seal housing by using bending only, without twisting of any section of the seal.

It will be appreciated that the cord and the gasket can have different shapes or thicknesses to suit the arrangement of the housing.

In the above examples, the sealing gasket is a continuous one-piece sealing gasket. However, in other examples, the sealing gasket comprises multiple separate parts that are joined together. The multiple parts may be joined together by any joining means or methods, such as using an adhesive, fusion, or via an interference fit.

In the above examples, the sealing gasket has substantially constant cross-section over its parts. However, in other examples, the sealing gasket has non-constant cross-section.

In the above examples, the sealing gasket has square or rectangular cross-section. However, in other examples, some or all of the sealing gasket has an alternative cross-section other than square or rectangular, such as circular, triangular, oval, etc.

In the above examples, the sealing gasket may be made of an elastomer. In some examples, the sealing gasket may be made of a different, deformable material, for example, a metal.

Although the major faces of the sealing gasket in the above examples are substantially planar, it will be appreciated that they may be any shape which is suitable for engaging with the major faces of the end plates and the adjacent faces of the shell stators.

Although in FIG. 2, sixteen protrusions are shown on the sealing gasket, it will be appreciated by those skilled in the art that any appropriate number of protrusions and corresponding slots in the seal groove may be implemented. A greater number of protrusions and slots tends to reduce the likelihood of the sealing gasket moving out of the seal groove.

In the above examples, the protrusions have a shape as described in more detail earlier above with reference to FIG. 4. In particular, the protrusions have rounded square or rounded rectangular cross sections, taper inwardly along their lengths from proximal end to distal end, and extend from the body of the sealing gasket in one direction. However, in other examples, the protrusions have different appropriate shapes or configurations.

Figure 9:
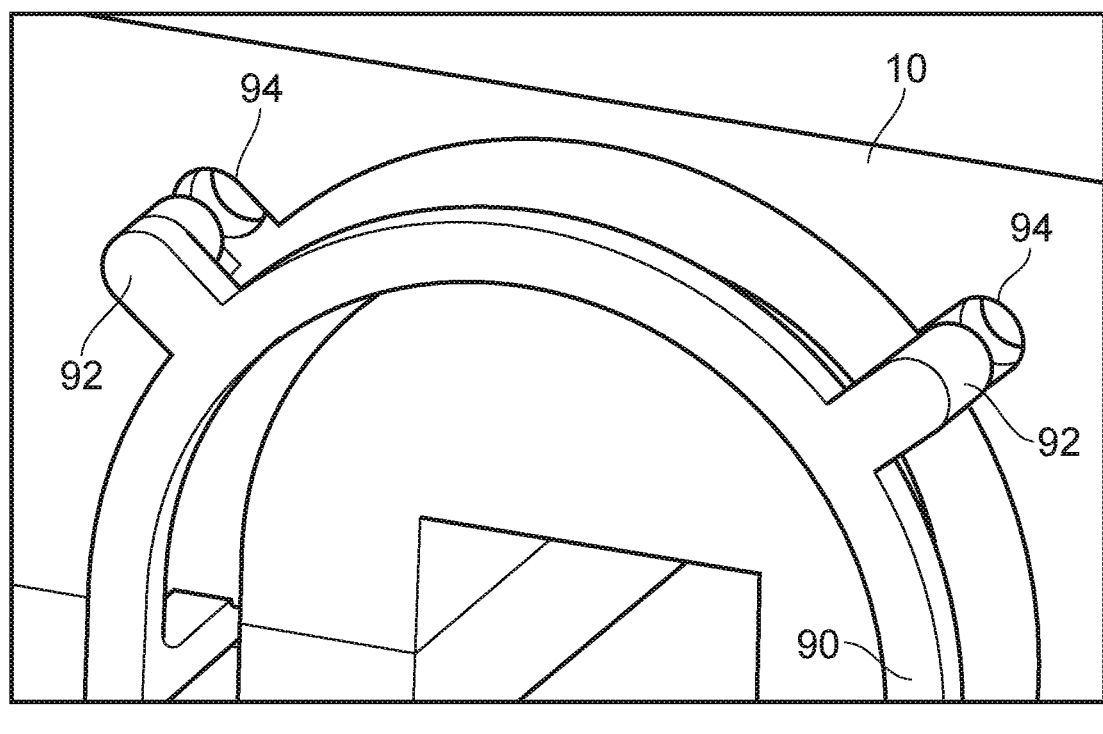
FIG. 9 is a schematic illustration (not to scale) showing a further sealing gasket incorporated into a housing.

FIG. 9 is a schematic illustration (not to scale) showing a further example of a sealing gasket 90. In this example, the protrusions 92 are substantially L-shaped or hook-shaped protrusions that fit or plug into correspondingly shaped voids 94 in the housing 10.

Figure 10:
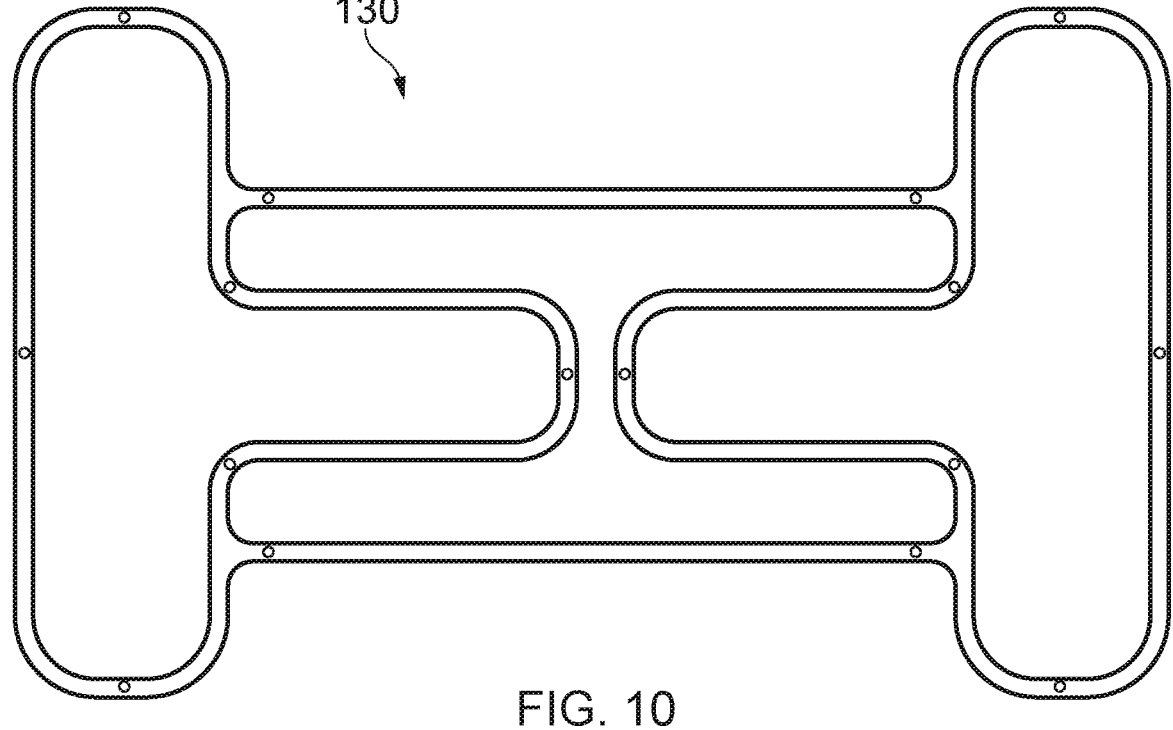
FIG. 10 is a schematic illustration (not to scale) showing an alternative sealing gasket.
Figure 11:
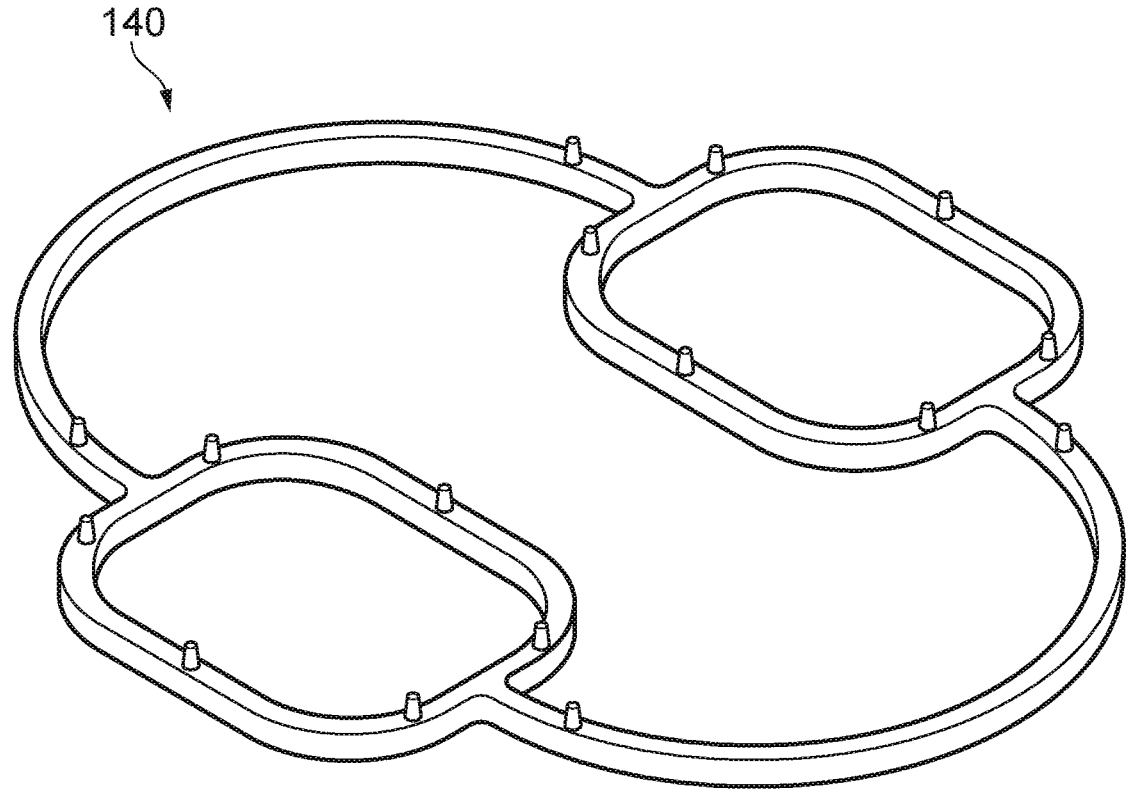
FIG. 11 is a schematic illustration (not to scale) showing an alternative sealing gasket.

In the above examples, the sealing gasket may be manufactured by moulding as a single-piece, as a substantially planar or flat item as shown in FIG. 2. However, in other examples, the sealing gasket may be manufactured in a different way, for example by moulding as a single-piece, as a substantially planar or flat item as shown in FIG. 10 (see single-piece, substantially planar or flat gasket 130) or FIG. 11 (see single-piece, substantially planar or flat gasket 140).

In some examples, the sealing gasket comprises annular sealing members that, in use, seal against the end plates. However, these sealing members may have shape other than strictly annular. The sealing members define closed shapes, and may define closed shapes other than annuluses such as loops, rings, ellipses, ovals, rounded squares or rounded rectangles (i.e. squares or rectangles with rounded corners), squircles, or rounded polygons.

An example in which the sealing members that, in use, seal against the end plates define rounded squares, i.e. substantially squircles, will now be described.

Figure 12:
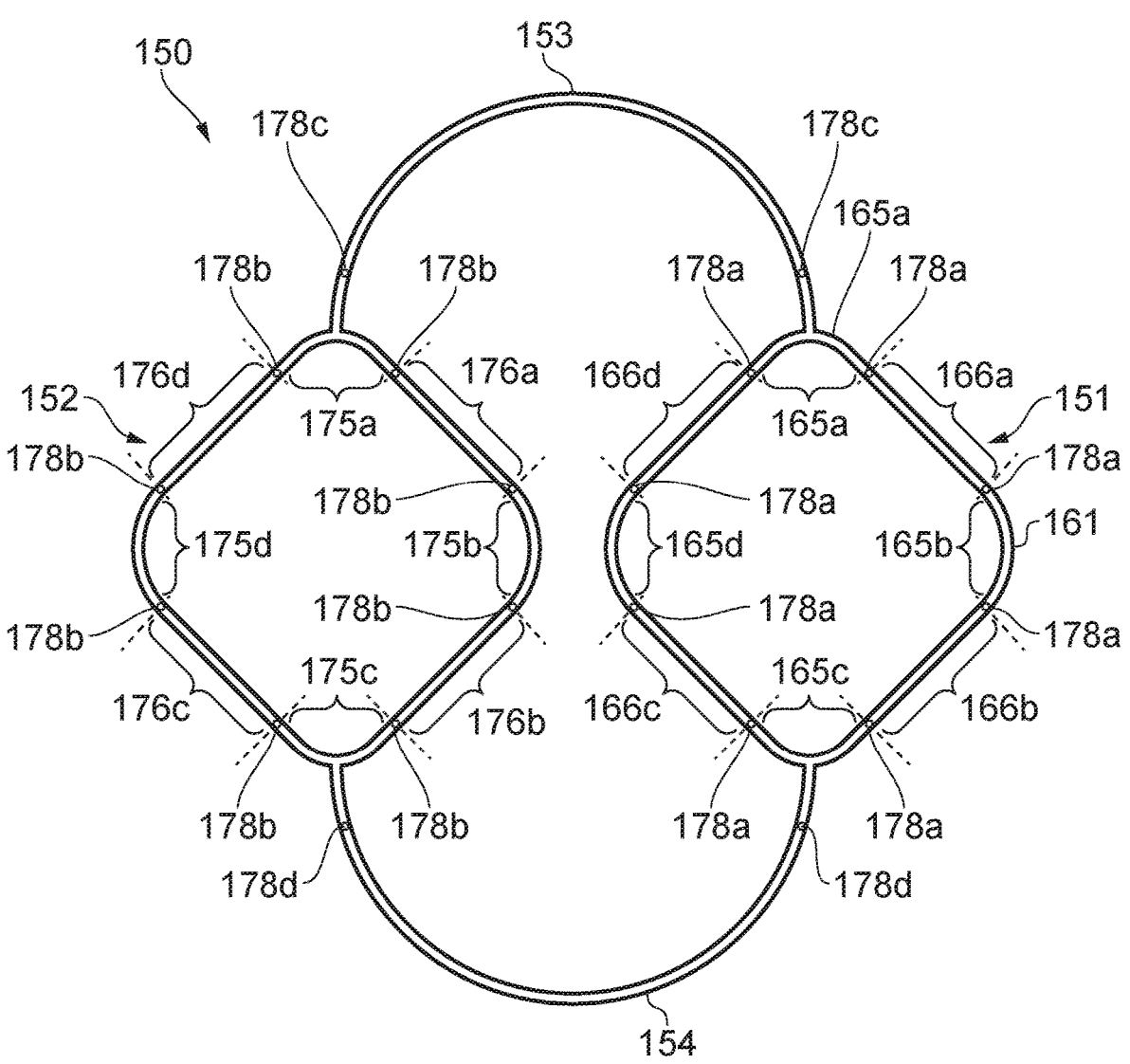
FIG. 12 is a schematic illustration (not to scale) of a top view of a further sealing gasket.
Figure 13:
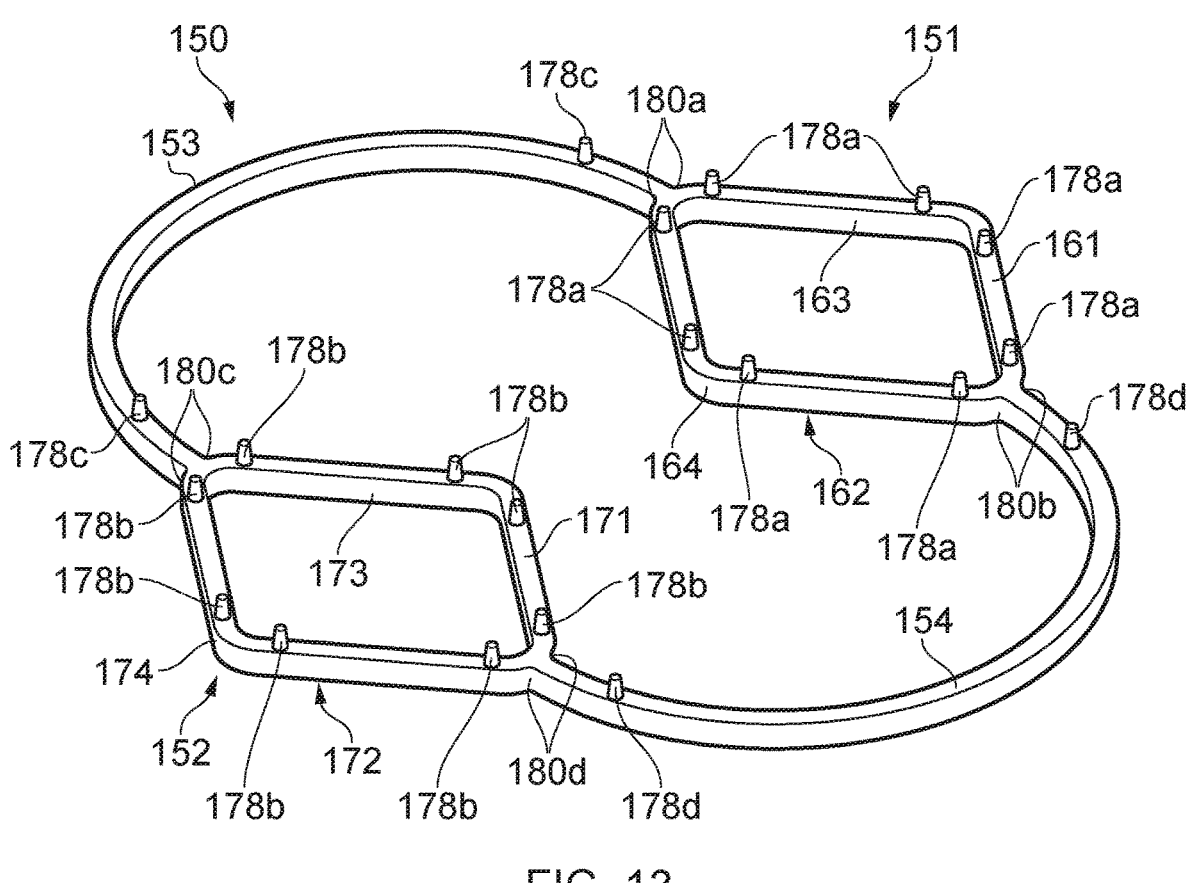
FIG. 13 is a schematic illustration (not to scale) of a perspective view of the further sealing gasket.

FIGS. 12 and 13 are schematic illustrations (not to scale) of a further sealing gasket 150 for sealing the housing 10, according to one example.

The sealing gasket 150 comprises a first sealing member 151, a second sealing member 152, a first longitudinal sealing member 153, and a second longitudinal sealing member 154.

The first sealing member 151 defines a closed shape. In particular, in this example, the first sealing member 151 defines a rounded square, i.e. a square with rounded corners, or substantially a squircle, The first sealing member 151 comprises a first rounded square surface 161, a second rounded square surface 162 opposite the first rounded square surface 161, a first inner surface 163, and a first outer surface 164 opposite to the first inner surface 163. The first inner surface 163 and the first outer surface 164 are disposed between the first rounded square surface 161 and the second rounded square surface 162.

The first sealing member 151 comprises a first curved section 165*a*, a second curved section 165*b*, a third curved section 165*c*, a fourth curved section 165*d*, a first substantially straight section 166*a* disposed between the first curved section 165*a* and the second curved section 165*b*, a second substantially straight section 166*b* disposed between the second curved section 165*b* and the third curved section 165*c*, a third substantially straight section 166*c* disposed between the third curved section 165*c* and the fourth curved section 165*d*, and a fourth substantially straight section 166*d* disposed between the fourth curved section 165*d* and the first curved section 165*a*. The first longitudinal sealing member 153 is connected to the first curved section 165*a*. The second longitudinal sealing member 154 is connected to the third curved section 165*c*.

The first sealing member 151 comprises a first plurality of protrusions 178*a*. The first plurality of protrusions 178*a* extend normally from the first rounded square surface 161. In this example, there are eight protrusions 178*a* in the first plurality of protrusions 178*a*. However, in other examples, there may be a different number of protrusions 178*a* in the first plurality of protrusions 178*a*.

In this example, the first plurality of protrusions 178*a* are located at respective boundaries between straight and curved sections of the first sealing member 151. There is a protrusion 178*a* located at the boundary between the first curved section 165*a* and the first substantially straight section 166*a*. Also, there is a protrusion 178*a* located at the boundary between the first substantially straight section 166*a* and the second curved section 165*b*. Also, there is a protrusion 178*a* located at the boundary between the second curved section

165*b* and the second substantially straight section 166*b*. Also, there is a protrusion 178*a* located at the boundary between the second substantially straight section 166*b* and the third curved section 165*c*. Also, there is a protrusion 178*a* located at the boundary between the third curved section 165*c* and the third substantially straight section 166*c*. Also, there is a protrusion 178*a* located at the boundary between the third substantially straight section 166*c* and the fourth curved section 165*d*. Also, there is a protrusion 178*a* located at the boundary between the fourth curved section 165*d* and the fourth substantially straight section 166*d*. Also, there is a protrusion 178*a* located at the boundary between the fourth substantially straight section 166*d* and the first curved section 165*a*.

The second sealing member 152 defines a closed shape. In particular, in this example, the second sealing member 152 defines a rounded square, i.e. a square with rounded corners, or substantially a squircle, The second sealing member 152 comprises a third rounded square surface 171, a fourth rounded square surface 172 opposite the third rounded square surface 171, a second inner surface 173, a second outer surface 174 opposite to the second inner surface 173. The second inner surface 173 and the second outer surface 174 are disposed between the third rounded square surface 171 and the fourth rounded square surface 172.

The second sealing member 152 comprises a fifth curved section 175*a*, a sixth curved section 175*b*, a seventh curved section 175*c*, an eighth curved section 175*d*, a fifth substantially straight 176*a* section disposed between the fifth curved section 175*a* and the sixth curved section 175*b*, a sixth substantially straight section 176*b* disposed between the sixth curved section 175*b* and the seventh curved section 175*c*, a seventh substantially straight section 176*c* disposed between the seventh curved section 175*c* and the eighth curved section 175*d*, and an eighth substantially straight section 176*d* disposed between the eighth curved section 175*d* and the fifth curved section 175*a*. The first longitudinal sealing member 153 is connected to the fifth curved section 175*a*. The second longitudinal sealing member 154 is connected to the seventh curved section 175*c*.

The second sealing member 152 comprises a second plurality of protrusions 178*b*. The second plurality of protrusions 178*b* extend normally from the third rounded square surface 171. In this example, there are eight protrusions 178*b* in the second plurality of protrusions 178*b*. However, in other examples, there may be a different number of protrusions 178*b* in the second plurality of protrusions 178*b*.

In this example, the second plurality of protrusions 178*b* are located at respective boundaries between straight and curved sections of the second sealing member 152. There is a protrusion 178*b* located at the boundary between the fifth curved section 175*a* and the fifth substantially straight section 176*a*. Also, there is a protrusion 178*b* located at the boundary between the fifth substantially straight section 176*a* and the sixth curved section 175*b*. Also, there is a protrusion 178*b* located at the boundary between the sixth curved section 175*b* and the sixth substantially straight section 176*b*. Also, there is a protrusion 178*b* located at the boundary between the sixth substantially straight section 166*b* and the seventh curved section 175*c*. Also, there is a protrusion 178*b* located at the boundary between the seventh curved section 175*c* and the seventh substantially straight section 176*c*. Also, there is a protrusion 178*b* located at the boundary between the seventh substantially straight section 176*c* and the eighth curved section 175*d*. Also, there is a protrusion 178*b* located at the boundary between the eighth curved section 175*d* and the eighth substantially straight section 176*d*. Also, there is a protrusion 178*b* located at the boundary between the eighth substantially straight section 176*d* and the fifth curved section 175*a*.

The first longitudinal sealing member 153 is connected or attached between the first outer surface 164 (of the first sealing member 151) and the second outer surface 174 (of the second sealing member 152).

The first longitudinal sealing member 153 comprises a third plurality of protrusions 178*c* extending normally therefrom. In this example, there are two protrusions 178*c* in the third plurality of protrusions 178*c*. However, in other examples, there may be a different number of protrusions 178*c* in the third plurality of protrusions 178*c*.

The second longitudinal sealing member 154 is connected or attached between the first outer surface 164 (of the first sealing member 151) and the second outer surface 174 (of the second sealing member 152).

The second longitudinal sealing member 154 is arranged opposite to the first longitudinal sealing member 153. That is to say, the second longitudinal sealing member 154 is connected to the first and second sealing members 151, 152 and at an opposite side of the first and second sealing members 151, 152 to the side at which the first longitudinal sealing member 153 is connected to the first and second sealing members 151, 152.

The second longitudinal sealing member 154 comprises a fourth plurality of protrusions 178*d* extending normally therefrom. In this example, there are two protrusions 178*d* in the fourth plurality of protrusions 178*d*. However, in other examples, there may be a different number of protrusions 178*d* in the fourth plurality of protrusions 178*d*.

Preferably, the plurality of protrusions 178*a-d* are substantially identical in shape and size.

The first seal member 151 has a square or rectangular cross-section. The second seal member 152 has a square or rectangular cross-section.

The first longitudinal sealing member 153 may be an O-ring cord. The first longitudinal sealing member 153 may have a square or rectangular cross-section.

The second longitudinal sealing member 154 may be an O-ring cord. The second longitudinal sealing member 154 may have a square or rectangular cross-section.

In this example, the sealing gasket 150 is a continuous one-piece sealing gasket.

The sealing gasket 150 is made of a deformable or flexible material, such as an elastomer material (e.g. a fluoroelastomers (FKM/FPM) or a perfluoroelastomer (FFKM)) or silicon, such that the sealing gasket 150 is deformable or flexible. Thus, the sealing gasket 150 may be deformed into a desired shape or configuration suitable for use as a seal for the housing 10.

The sealing gasket 150 may be installed into the housing 10, for example as described in more detail earlier above with reference to FIG. 5. In this way, the first and second longitudinal sealing members 153, 154 may be disposed in sealing engagement with the shell stators 12, 14, which may be clamped together to compress the longitudinal sealing members 153, 154. Also, the rounded square sealing members 151, 152 may be located in closed-shape seal grooves located in the shell stators 12, 14 and/or the end plates 16, 18. A seal groove may have any appropriate closed shape, such as an anulus, a circle, an oval, an ellipse, a stadium, a rounded square, a squircle, a rounded rectangle, a rounded polygon, etc.

Figure 14:
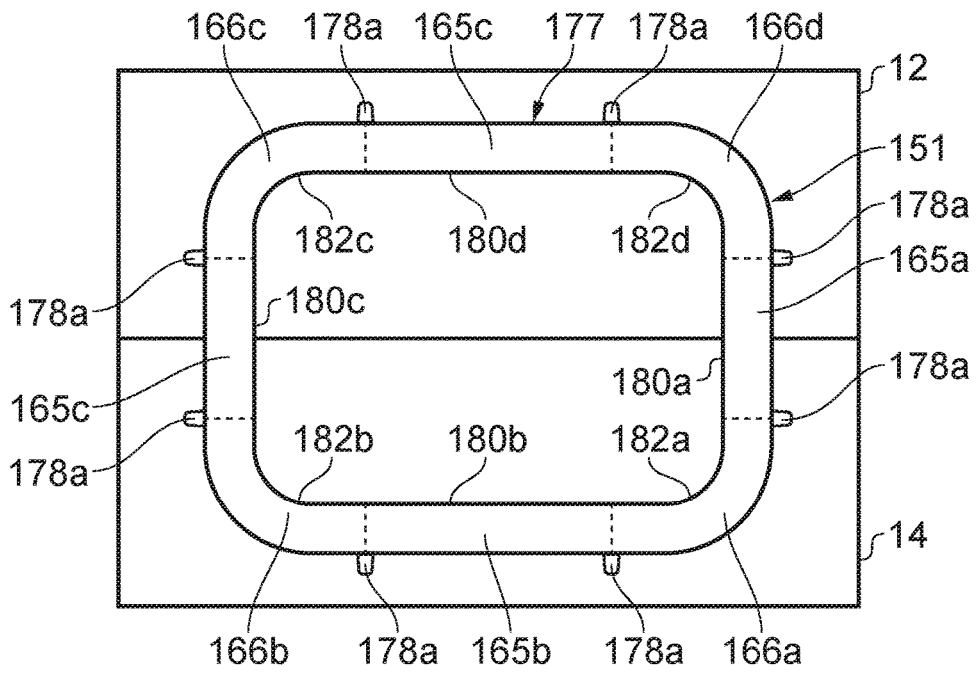
FIG. 14 is a schematic illustration (not to scale) showing the portion of the further sealing gasket disposed in a seal groove formed in the shell stators of the housing.

FIG. 14 is a schematic illustration (not to scale) showing the first sealing member 151 fitted into a closed-shape seal groove 177 located in the shell stators 12, 14. In this example, the seal groove 177 defines a rounded square or rounded rectangle. In this example, the second sealing member 152 may be fitted into substantially identical closed-shape seal groove 177 at the opposite end of the shell stators 12, 14.

In this example, the curved sections 165*a-d* of the first sealing member 151 are located in respective substantially straight portions of the seal groove 177. Also, the substantially straight sections 166*a-d* of the first sealing member 151 are located in respective curved portions of the seal groove 177.

In particular, the first curved section 165*a* is disposed in a first substantially straight portion 180*a* of the seal groove 177, the second curved section 165*b* is disposed in a second substantially straight portion 180*b* of the seal groove 177, the third curved section 165*c* is disposed in a third substantially straight portion 180*c* of the seal groove 177, the fourth curved section 165*d* is disposed in a fourth substantially straight portion 180*d* of the seal groove 177, the first substantially straight section 166*a* is disposed in a first curved portion 182*a* of the seal groove 177, the second substantially straight section 166*b* is disposed in a second curved portion 182*b* of the seal groove 177, the third substantially straight section 166*c* is disposed in a third curved portion 182*c* of the seal groove 177, and the fourth substantially straight section 166*d* is disposed in a fourth curved portion 182*d* of the seal groove 177.

As described above, the substantially rounded square sealing members being located in the rounded square seal groove such that the curved sections of the rounded square sealing member are located in substantially straight portions of the seal groove, and such the substantially straight sections of the sealing member are located in curved portions of the seal groove 177. This advantageously tends to reduce stresses in the rounded square sealing members. In particular, compound bending and/or twisting of the sealing member when installing the sealing member in the seal groove tends to be reduced compared to other shapes of sealing member. This tends to improve seal life. Furthermore, retention of the sealing member within the seal groove retention tends to be improved. For example, the reduced twisting and/or compound bending of the sealing member tends to reduce the sealing member twisting out of the seal groove.

The protrusions 178*a-d* are interference fit in respective slots. This advantageously tends to improve retention of the sealing member within the seal groove and reduce the likelihood of leaks.

Although illustrative examples of the disclosure have been disclosed in detail herein, with reference to the accompanying drawings, it is understood that the disclosure is not limited to the precise example and that various changes and modifications can be effected therein by one skilled in the art without departing from the scope of the disclosure as defined by the appended claims and their equivalents.

The invention claimed is:

1. A sealing gasket for a vacuum pump, the sealing gasket comprising:
   a first surface;
   a second surface opposite to the first surface;
   opposing side walls disposed between the first and second surfaces;
   a first sealing member defining a first closed shape;
   a second sealing member defining a second closed shape;

a first longitudinal sealing member connected between a first facing axially inner face of the first sealing member and a second facing axially inner face of the second sealing member; and a second longitudinal sealing member connected between the first facing axially inner face of the first sealing member and the second facing axially inner face of the second sealing member, wherein the sealing gasket is a moulded, deformable, one-piece gasket, the first sealing member, the second sealing member, the first longitudinal sealing member, and the second longitudinal sealing member have a square or rectangular cross section, and one or more protrusions extend radially outwards from the first sealing member from the first surface that defines a radially outer wall of the first sealing member.

2. The sealing gasket of claim 1, comprising a plurality of protrusions extending from the first surface spaced apart from one another at discrete positions across the first surface.

3. The sealing gasket of claim 1, wherein the one or more protrusions extend perpendicularly from the first surface.

4. The sealing gasket of claim 1, wherein each of the protrusions has a cross section, the shape of which is a rounded polygon, a rounded square or a rounded rectangle.

5. The sealing gasket of claim 1, wherein each of the one or more protrusions comprises:

a proximal end at which the protrusion is connected to the first surface; and a distal end opposite to the proximal end; and wherein:

a length of the protrusion between the proximal end and the distal end is between 1 mm and 6 mm.

6. The sealing gasket of claim 1, wherein each of the one or more protrusions comprises:

a proximal end at which the protrusion is connected to the first surface; and a distal end opposite to the proximate end; and wherein:

the proximal end is spaced apart from one or both of the opposing side walls in a direction from one side wall to another side wall.

7. The sealing gasket of claim 6, wherein:

the proximal end is spaced apart from a first side wall in the direction from one side wall to another side wall by a distance of less than or equal to 0.4 mm; and/or the proximal end is spaced apart from a second side wall in the direction from one side wall to another side wall by a distance of less than or equal to 0.4 mm.

8. The sealing gasket of claim 1, wherein the sealing gasket is an elastomer.

9. The sealing gasket of claim 1, wherein the first sealing member and the second sealing member define a respective closed shape of an annulus, a circle, an oval, an ellipse, a stadium, a rounded polygon, a rounded square, a rounded rectangle, or a squircle.

10. The sealing gasket of claim 1, wherein the first sealing member and the second sealing member each comprise a respective plurality of the protrusions which extend outwardly from a respective radially outer wall of the first sealing member and the second sealing member.

11. The sealing gasket of claim 1, wherein the vacuum pump, comprising comprises:

shell stators defining at least one pumping chamber;

end pieces mountable at either end of the shell stator; and the sealing gasket, wherein the shell stators or the end pieces define one or more seal grooves in which the sealing gasket is located;

the one or more seal grooves comprise one or more voids extending from a side wall of the seal grooves; and the one or more protrusions are received in respective voids.

12. The sealing gasket of claim 11, wherein the voids are slots.

13. The sealing gasket of claim 11, wherein for each protrusion and the respective void in which it is received, the length of that void from an open end of the void to a closed end of the void is greater than the length of the portion of that protrusion that is within the void, thereby to allow for expansion of the protrusion within the void in the direction along the length of the protrusion.

14. The sealing gasket of claim 11, wherein for each protrusion and the respective void in which it is received, the width of that void in a direction that is perpendicular to the direction from an open end of the void to a closed end of the void is less than or equal to the width of the portion of that protrusion that is within the void, thereby to provide an interference fit of the protrusion in the void.

* * * * *